(12) United States Patent
Ballard (10) Patent No.: US 11,467,994 B2
(45) Date of Patent: Oct. 11, 2022

(54) IDENTIFIERS FOR CONNECTIONS BETWEEN HOSTS AND STORAGE DEVICES

(71) Applicant: HEWLETT PACKARD ENTERPRISE DEVELOPMENT LP, Houston, TX (US)

(72) Inventor: Curtis C. Ballard, Eaton, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/119,339

(22) Filed: Dec. 11, 2020

(65) Prior Publication Data

US 2022/0188256 A1    Jun. 16, 2022

(51) Int. Cl.
| | |
|---|---|
| G06F 13/364 | (2006.01) |
| G06F 15/173 | (2006.01) |
| G06F 13/40 | (2006.01) |
| G06F 13/38 | (2006.01) |

(52) U.S. Cl.
CPC .......... *G06F 13/364* (2013.01); *G06F 13/382* (2013.01); *G06F 13/4063* (2013.01); *G06F 15/173* (2013.01)

(58) Field of Classification Search
CPC ... G06F 13/382; G06F 13/634; G06F 13/4063
See application file for complete search history.

(56) References Cited

U.S. PATENT DOCUMENTS

| | | | |
|---|---|---|---|
| 9,430,412 B2 | 8/2016 | Huang | |
| 9,747,039 B1 | 8/2017 | Coleman et al. | |
| 10,606,508 B1 | 3/2020 | Izawa et al. | |
| 10,620,840 B2* | 4/2020 | Freyensee | G06F 3/0659 |
| 10,768,820 B2* | 9/2020 | Subramanian | G06F 3/0665 |
| 10,880,205 B1* | 12/2020 | Puttagunta | H04L 41/0853 |
| 11,016,911 B2* | 5/2021 | Balasubramani | |
| | | | G06F 15/17331 |
| 2020/0225874 A1* | 7/2020 | Nimmagadda | ... G06F 15/17331 |
| 2021/0303528 A1* | 9/2021 | Meister | G06F 16/162 |

OTHER PUBLICATIONS

Cisco; "Chapter: AXSM Command Reference (Addapsln Through Cnfimalnktst)"; Jan. 2004; 112 pages.
NVM Express, NVM Express Moves Into the Future retrieved on Nov. 2, 2020 (7 pages).
NVM Express, Revision 1.4b, Base Specification, Revision 1.4b, Sep. 21, 2020(406 pages).

(Continued)

*Primary Examiner* — Brian T Misiura
(74) *Attorney, Agent, or Firm* — Trop, Pruner & Hu, P.C.

(57) ABSTRACT

In some examples, an adapter device includes a bridge to determine that a storage device includes a plurality of bus controllers, where the plurality of bus controllers are communicatively coupled to respective adapter devices. The bridge determines a quantity of supported connections over the network to the storage device, and in response to determining that the storage device comprises the plurality of bus controllers, the bridge computes an identifier based on the quantity of supported connections and to which respective bus controller of the plurality of bus controllers the adapter device is connected, and assigns the identifier to a connection from the host to the storage device.

20 Claims, 4 Drawing Sheets

(56) References Cited

OTHER PUBLICATIONS

NVM Express; "NVM Express(TM) Over Fabrics Revision 1.1"; Oct. 22, 2019; 83 pages.
Rouse, Margaret, NVMe over Fabrics (NVMe-oF), 2020 (9 pages).
Sriramulu et al., Dell EMC, NVME Over Fabrics: New Class of Storage, 2018, 10 pages.
Wikipedia, PCI Express last edited Oct. 31, 2020 (30 pages).
R. Droms, "Dynamic Host Configuration Protocol," Mar. 1997, Network Working Group, Request for Comments: 2131, <https://www.rfc-editor.org/rfc/pdfrfc/rfc2131.txt.pdf>, pp. 1-45.

\* cited by examiner

IDENTIFIERS FOR CONNECTIONS BETWEEN HOSTS AND STORAGE DEVICES

BACKGROUND

A storage device can be accessed over a network by a host or multiple hosts. In some cases, multiple connections can be established between the host(s) and the storage device.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

As used here, a "storage device" can refer to an individual storage device, such as a disk-based storage device (e.g., a hard drive, an optical drive, etc.), a solid state drive (SSD), and so forth. A "storage device" can alternatively refer to a storage system that includes an array of storage devices.

A "host" can refer to an entity that is able to interact with a storage device. A host can refer to a computer or a program (including machine-readable instructions). An example of a host is a storage controller that manages read and write access of data stored by a storage device. A host can also refer to a server computer, a user computer, a program that executes in a computer, or any other type of entity.

Non-Volatile Memory Express® (NVMe®) refers to a protocol for accessing a storage device. NVMe® is hereinafter referred to as "NVME." A storage device that is able to process commands (e.g., read commands, write commands, administrative commands, etc.) from a host is referred to as an "NVME storage device." As an example, NVMe over Fabrics™ (NVMe-oF™) is a protocol that allows a host to access a storage device over a network using the NVME protocol. NVMe-oF™ is hereinafter referred to as "NVME-OF" or "NON-VOLATILE MEMORY EXPRESS (NVME)-OVER-FABRICS."

Using NVME-OF, data and commands according to NVME can be communicated between a host and a storage device over a network, such as an Ethernet network, a Fibre Channel (FC) network, and so forth. Ethernet and FC are examples of protocols that govern data communications over a network. In other examples, NVME-OF can support NVME data transfer between hosts and storage devices over other types of networks.

Although reference is made to NVME and NVME-OF in the ensuing discussion, it is noted that in other examples, other protocols that support data transfers and storage device management between hosts and storage devices over networks can be employed.

Figure 1:
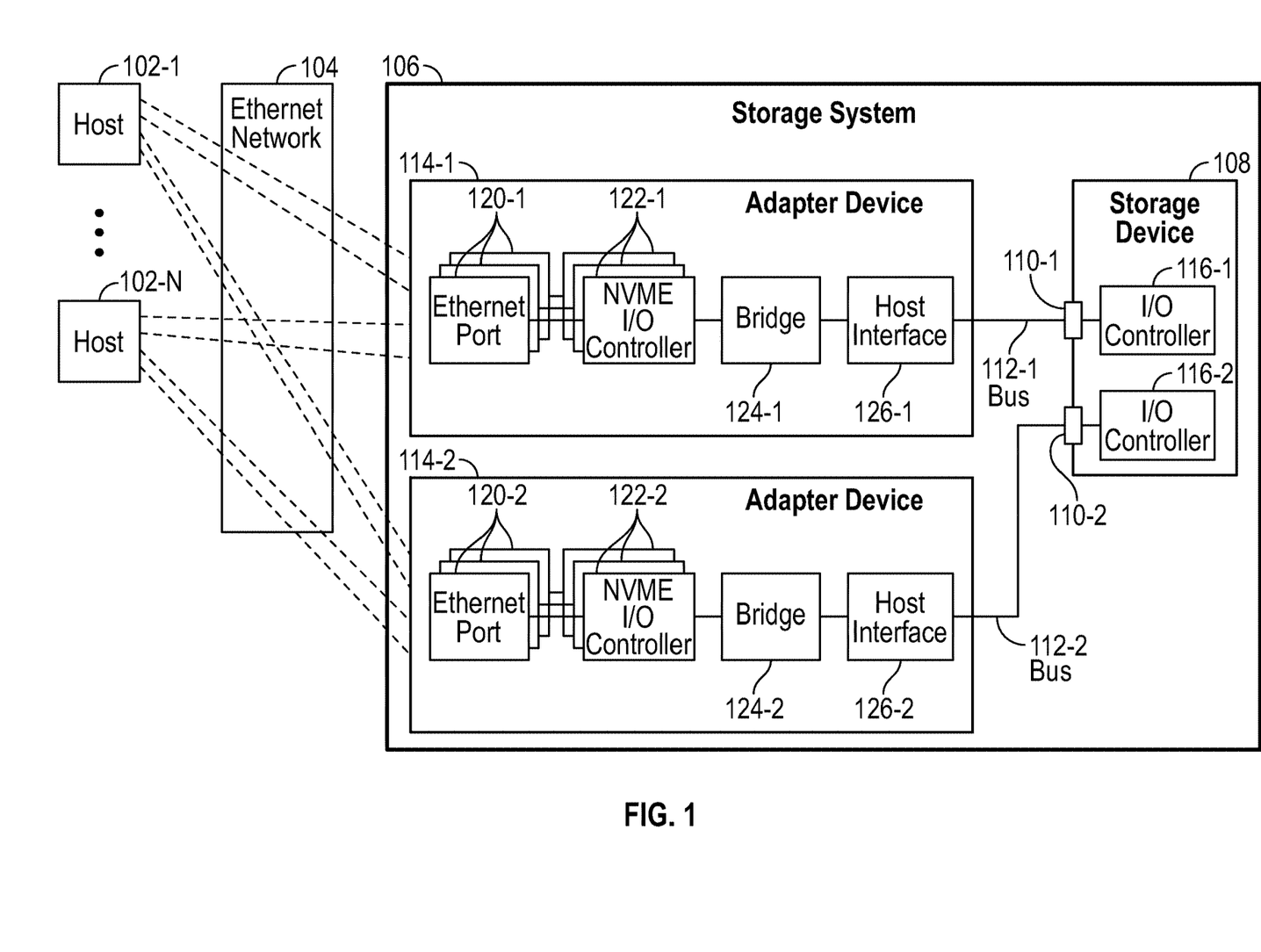
FIG. 1 is a block diagram of an arrangement that includes a storage system according to some examples.

FIG. 1 shows an example of an arrangement in which hosts 102-1 to 102-N, where N 2, can be coupled over connections (represented by dashed lines in FIG. 1) over an Ethernet network 104 to a storage system 106 that includes a storage device 108 (e.g., an NVME storage device). Although just one storage device 108 is shown in FIG. 1, the storage system 106 can include multiple storage devices in other examples.

Although FIG. 1 shows multiple hosts 102-1 to 102-N, it is noted that in other examples, there can be just one host that is connected over multiple connections to the storage system 106.

In examples where a network between a host and a storage system is an Ethernet network (e.g., 104), the connections between the host and the storage system can be Ethernet socket connections. In other examples, the network 104 can be in FC network or another type of network, in which case other types of connections are established between a host and the storage system 106.

A "connection" refers to a path (separately identifiable from another path) over which a host is able to communicate with the storage system 106, and in particular, with the storage device 108 in the storage system 106.

The ensuing discussion refers to use of an Ethernet network between the hosts 102-1 to 102-N and the storage system 106. Similar techniques or mechanisms according to the present disclosure can be applied to other types of networks between the hosts 102-1 to 102-N and the storage system 106.

The storage device 108 of FIG. 1 is a multi-port storage device that has multiple bus ports 110-1 and 110-2 connected over respective computer buses 112-1 and 112-2 to corresponding adapter devices 114-1 and 114-2. The storage device 108 includes multiple bus I/O controllers 116-1 and 116-2 that are connected to the respective computer buses 112-1 and 112-2 through the corresponding bus ports 110-1 and 110-2.

Although FIG. 1 shows the storage device 108 having two bus ports 110-1 and 110-2, in other examples, the storage device 108 can have more than two bus ports connected over respective computer buses. The inclusion of multiple bus ports and respective bus I/O controllers can be for high availability, which allows the storage device 108 to continue to be accessed even if one of the bus ports and/or bus I/O controllers were to fail. In other examples, multiple bus ports and respective bus I/O controllers can be included in the storage device 108 to allow for parallel access over multiple paths for greater data transfer throughput.

The number of adapter devices (114-1 and 114-2 shown in FIG. 1) connected over respective computer buses to bus ports of the storage device 108 is based on the number of bus ports of the storage device 108. For example, if the storage device 108 has four bus ports, then four adapter devices would be connected over respective computer buses to the four ports of the storage device 108.

Although FIG. 1 shows the adapter devices 114-1 and 114-2 as being part of the storage system 106, in other examples, the adapter devices 114-1 and 114-2 can be separate from the storage system 106.

In some examples, the storage device 108 is an NVME storage device that is able to perform data transfers according to the NVME protocol, in response to read or write commands from a host (e.g., 102-1 to 102-N). NVME-OF supports transfer of NVME information (e.g., commands and data) between the hosts 102-1 to 102-N and the storage system 106 over the Ethernet network 104.

Each bus I/O controller 116-1 or 116-2 allows the storage device 108 to communicate over a respective computer bus 112-1 or 112-2. In some examples, the computer buses 112-1 and 112-2 are Peripheral Component Interconnect Express (PCIe®) buses. PCIe® is hereinafter referred to as "PCIE." PCIE is a high-speed expansion bus protocol that supports communications between components of a computer (such as the storage system 106 of FIG. 1) over a computer bus.

In other examples, communications over the computer buses 112-1 and 112-2 can be according to other bus protocols, whether standardized, open source, or proprietary. In some examples, the bus I/O controllers 116-1 and 116-2 are NVMe I/O controllers that are capable of communicating over the computer buses 112-1 and 112-2 according to the bus protocol.

In some examples, data transfers between the hosts 102-1, 102-2 and the storage system 106 over the Ethernet network 104 are according to NVME-OF. The adapter devices 114-1 and 114-2 perform a conversion between first information according to an NVME-OF format (transported over the Ethernet network 104 or another type of network) and second information according to an NVME-over-bus format (e.g., NVMe®-over-PCIe® in examples where the computer buses 112-1 and 112-2 are PCIE buses). For example, commands according to the NVME-OF format can be converted to commands according to the NVME-over-bus format, and vice versa.

"Converting" information (e.g., a command, a response to a command, etc.) between different formats, such as between the NVME-OF format and the NVME-over-bus format can involve a small modification of the command, such as removing information from or adding information to the command. Note that the information (e.g., a command, a response to a command, etc.) stays the same, except that certain information element(s) is (are) added, removed, or changed due to differences between Ethernet and the computer bus protocol (e.g., PCIE). For example, a first information element in a command (sent by a host) according to the NVME-OF format that is supported over a network fabric (such as the Ethernet network 104) but not on the computer bus 112-1 or 112-2 can be removed from the command by an adapter device 114-1 or 114-2 prior to the adapter device 114-1 or 114-2 sending the modified command (which is now according to the NVME-over-bus format due to the removal of the first information element) to the storage device 108 over the computer bus 112-1 or 112-2. Similarly, a second information element (sent by the storage device 108) in a response according to the NVME-over-bus format that is supported over the computer bus 112-1 or 112-2 but not over a network fabric (such as the Ethernet network 104) can be removed from the response by an adapter device 114-1 or 114-2 prior to the adapter device 114-1 or 114-2 sending the modified response (which is now according to the NVME-OF format due to the removal of the second information element) to a host 102-1 or 102-N over the network fabric. As other examples, converting a command or response between the NVME-OF format and the NVME-over-bus format can include adding information element(s) to the command or response, such as adding information element(s) to be used on a network fabric or a computer bus.

In some examples, the adding and/or removal of information element(s) from a command or response is different from wrapping and unwrapping operations, where a data packet or frame containing the command or response is wrapped by adding a header to the data packet or frame, or unwrapped by removing a header from the data packet or frame. The information element(s) added or removed is (are) part of the command or response itself.

In other cases, some commands sent by hosts may be processed by an adapter device 114-1 or 114-2 without forwarding to the storage device 108. As further examples, some commands sent by hosts may be blocked by an adapter device 114-1 or 114-2. In other examples, a subset of NVME commands do not have to be converted, but can simply be forwarded by an adapter device 114-1 or 114-2 between a host and the storage device 108.

Examples of commands that are converted by an adapter device 114-1 or 114-2 can include NVME administrative commands that are issued to perform administrative tasks, such as to request information regarding capabilities of an attached device, to perform a configuration of an attached device, and so forth. Note that NVME administrative commands are different from NVME read and write commands for reading data from and writing data to the storage device 108, respectively.

As an example, a host 102-1 or 102-N can send a given NVME command over the Ethernet network 104 according to the NVME-OF format to the storage system 106. An adapter device 114-1 or 114-2 converts the given NVME command according to the NVME-OF format to an NVME command according to an NVME-over-bus format (e.g., NVMe®-over-PCIe® format).

In the example of FIG. 1, the host 102-1 can establish multiple connections with the adapter device 114-1, and multiple connections with the adapter device 114-2. Similarly, the host 102-N can establish multiple connections with the adapter device 114-1 and multiple connections with the adapter device 114-2. More generally, each of the hosts 102-1 to 102-N can establish multiple connections with the storage system 106.

According to NVME-OF, controllers (e.g., NVME I/O controllers 122-1 and 122-2 depicted in FIG. 1, discussed further below) are assigned to each of the connections, and controller identifiers are assigned to the controllers. Thus, if a given host 102-1 or 102-N has multiple connections with the adapter device 114-1, then the adapter device 114-1 assigns multiple different controller identifiers to the respective connections (by way of assigning multiple controllers) to the given host. NVME specifies that different controllers in an NVME subsystem are assigned different controller identifiers.

Similarly, the adapter device 114-2 can assign different controller identifiers to the respective connections to the given host.

As an example, a given adapter device 114-1 or 114-2 can assign controller identifiers sequentially starting from controller identifier 1, then proceeding to control identifier 2, control identifier 3, and so forth. More generally, the given adapter device can assign controller identifiers sequentially starting from controller identifier A (where A can be a numeric value), then proceeding to controller identifier B (where B can be a numeric value greater than A), then proceeding to controller identifier C (where C can be a numeric value greater than B), and so forth.

Each adapter device can use the same algorithm for assigning controller identifiers. The two adapter devices 114-1 and 114-2 that are connected to the bus ports 110-1 and 110-2, respectively, of the same storage device 108 can assign the same collection of controller identifiers to connections of a given host. For example, if the host 102-1 has 16 connections to the adapter device 114-1 and 16 connections to the adapter device 114-2, then the adapter device 114-1 and the adapter device 114-2 can each assign the same collection of 16 controller identifiers to their respective 16 connections to the host 102-1.

The assigned controller identifiers are associated with the storage device 108, which has a unique name. As a result, the assigned controller identifiers are associated with the unique name of the storage device 108. According to NVME, the unique name is referred to as an NVM Subsystem NVMe® Qualified Name (subNQN).

The adapter devices 114-1 and 114-2 will assign the same collection of controller identifiers based on the fact that they are both connected to the storage device 108 having the same unique name.

An operating system in the host 102-1 will detect a conflict in controller identifiers assigned to connections between the host 102-1 and the adapter devices 114-1 and 114-2. The operating system of the host 102-1 can issue an error indicating that conflicting controller identifiers have been assigned by the adapter device 114-2 (conflicting because the controller identifiers assigned by the adapter device 114-2 to the 16 connections between the adapter device 114-2 and the host 102-1 are the same as the controller identifiers assigned by the adapter device 114-1 to the 16 connections between the adapter device 114-2 and the host 102-1). As a result, the host 102-1 may not be able to establish the connections to the adapter device 114-2.

In some examples, a host can use controller identifiers for various purposes, such as: detect loops in connections (where "loops" can refer to extra connections going the same place); track configuration settings or logs associated with a bus I/O controller of the storage device 108; associate the controller identifiers with logical storage units (referred to as "namespaces" in NVME); and so forth. Although examples are provided regarding how controller identifiers can be used, it is noted that controller identifiers (or more generally, identifiers associated with connections) can be used for other purposes in other examples.

In accordance with some implementations of the present disclosure, an adapter device 114-1 or 114-2 provided between a host (or multiple hosts) and a bus I/O controller 116-1 or 116-2 of the storage device 108 is able to determine how many bus I/O controllers are included in the storage device 108, and a quantity of supported connections (discussed further below) over a network (e.g., 104) to the storage device. The bus I/O controllers in the storage device 108 make up a collection of bus I/O controllers. The adapter device is able to assign unique identifiers to be used for respective connections based on the quantity of supported connections and how many bus controllers are included in the storage device.

When assigning an identifier (e.g., a controller identifier according to NVME-OF) to a given connection from a host, the adapter device is able to determine which particular bus I/O controller of the collection of bus I/O controllers the given connection is associated with. In some examples, the bus I/O controllers in the collection are assigned respective numbers or other identification values (e.g., 100, 200, 300, etc., or 1, 2, 3, etc., and so forth). Because the bus I/O controllers are numbered (or more generally assigned identification values that have an order), the adapter device is able to determine a position in the collection of bus I/O controllers occupied by the particular bus I/O controller the adapter device is connected to. As an example, if the storage device 108 reports that the storage device 108 has a collection of bus I/O controllers assigned numbers 100, 200, and 300 (e.g., a collection of three bus I/O controllers), and the adapter device detects that the adapter device is connected to a bus I/O controller assigned number 300, then the adapter device can determine that the adapter device is connected to the third bus I/O controller in the collection.

The adapter device uses this position of the particular bus I/O controller to which the adapter device is connected to compute an identifier assigned to the given connection (a process discussed in greater detail further below).

As further shown in FIG. 1, the adapter device 114-1 includes a number of Ethernet ports 120-1 to which various connections can be established to the host 102-1 to 102-N. The Ethernet ports 120-1 are connected to respective NVME I/O controllers 122-1, which are able to communicate according to NVME, and more specifically, according to NVME-OF over the Ethernet network 104.

In some examples, the NVME I/O controllers 122-1 are virtual devices in the adapter device 114-1, where the virtual devices are created in response to connection establishment requests from host(s). More specifically, in response to a connection establishment request (e.g., an NVME-OF Connect command) from a host, the adapter device creates a corresponding NVME I/O controller 122-1. The created NVME I/O controller 122-1 provides an access path between the host and logical storage units of the storage device 108. According to NVME, the logical storage units are referred to as "namespaces." A "logical storage unit" refers to a logical data structure defined in the storage device 108, where the logical data structure is able to store data. Different logical storage units are separately identifiable.

As part of establishing the connection in response to the connection establishment request from the host, the adapter device 114-1 is able to send a response to the host, where the response includes a controller identifier assigned to the connection, among other information.

In accordance with some implementations of the present disclosure, the adapter device 114-1 includes a bridge 124-1, which can process commands received from hosts 102-1 to 102-N, where the processing includes converting the commands before sending modified commands produced by the converting to the bus 112-1 for receipt by the bus I/O controller 116-1 in the storage device 108. Other commands processed by the bridge 124-1 cause an action to be performed in the adapter device 114-1, and these other commands are not forwarded over the bus 112-1 to the storage device 108. In other examples, processing of commands can include blocking commands from reaching the storage device 108. In further examples, processing of commands can include simply forwarding a command received from a host over the bus 112-1 to the storage device 108.

The adapter device 114-1 includes a host interface 126-1, which is able to perform communications over the bus 112-1 according to a protocol of the bus 112-1, such as the PCIE protocol.

In some examples, the adapter device 114-1 can be implemented as a programmable integrated circuit device, a programmable gate array, a microcontroller, a microprocessor, or any other type of processing circuit. The components in the adapter device 114-1 can be implemented using hardware circuitry and/or machine-readable instructions executable by the processing circuit of the adapter device 114-1.

The adapter device 114-2 similarly includes Ethernet ports 120-2, NVME I/O controllers 122-2, a bridge 124-2, and a host interface 126-2, which are similar to the corresponding components of the adapter device 114-1.

Figure 2:
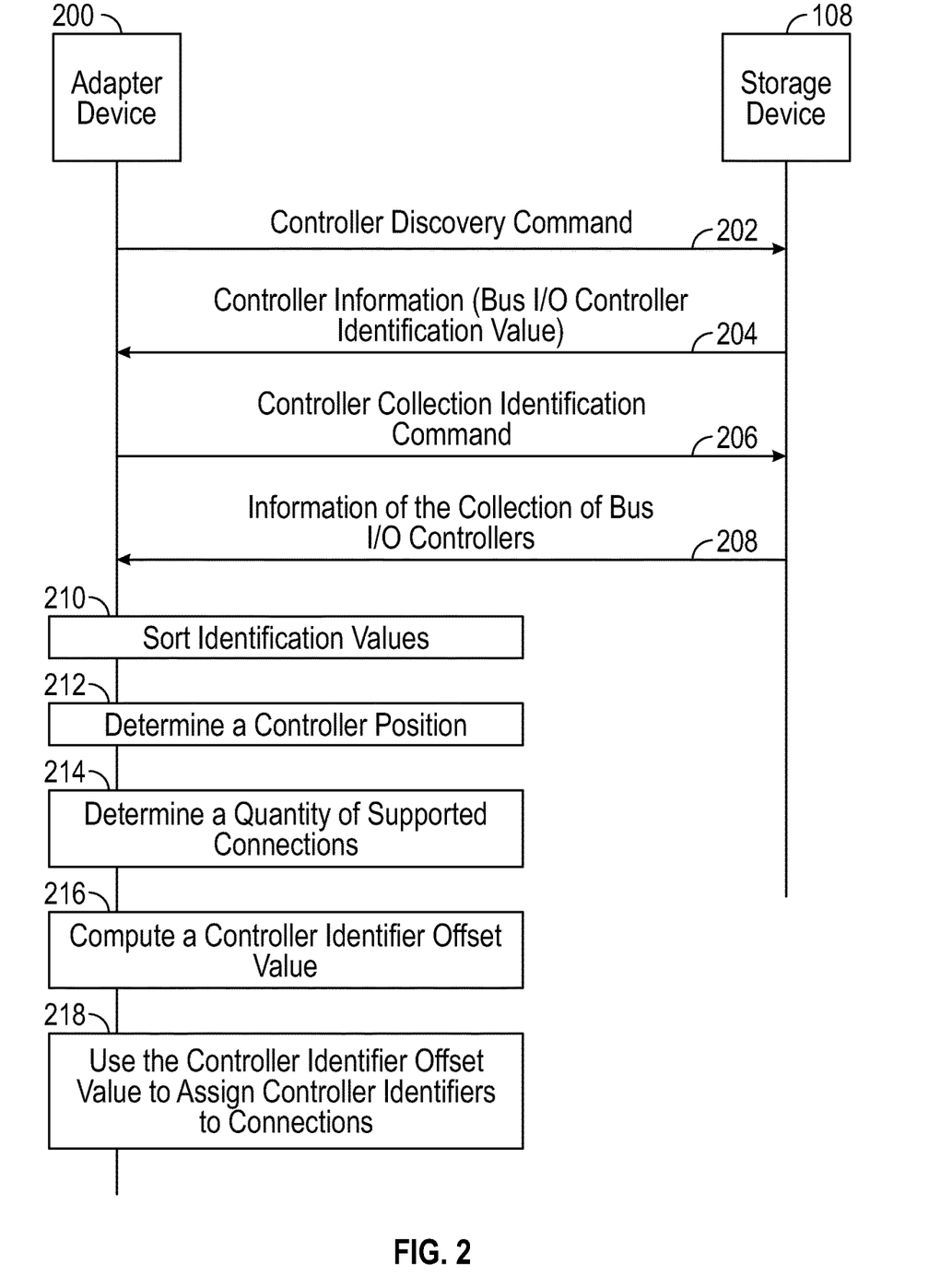
FIG. 2 is a flow diagram of a process of an adapter device and a storage device, according to some examples.

FIG. 2 is a flow diagram of a process performed by an adapter device 200 (e.g., the adapter device 114-1 or 114-2 of FIG. 1) and the storage device 108, according to some examples. Although FIG. 2 shows a specific sequence of tasks, note that in other examples, the tasks can be performed in a different sequence, some of the tasks may be omitted, and/or the process can include additional or alternative tasks.

The adapter device 200 can perform storage device discovery in response to an event, which can be any or some combination of the following: an event responsive to the adapter device starting up from a power off state, an event responsive to a user command or a command from another entity, and so forth.

As part of the storage device discovery, the adapter device 200 can send (at 202) a controller discovery command to read controller information associated with a bus port (e.g., 110-1 or 110-2) that the adapter device is connected to. In some examples, the controller discovery command includes an NVME command that is used to discover a bus I/O controller that the adapter device 200 is connected to. For example, the controller discovery command can be an NVME Identify command requesting the Identify Controller data structure. In response to the controller discovery command, the storage device 108 returns (at 204) controller information. The controller information can include information about the given bus I/O controller (e.g., 116-1 or 116-2 in FIG. 1) to which the adapter device 200 is connected. For example, the controller information can include an identification value (e.g., a number) assigned to the given bus I/O controller.

The adapter device 200 can further send (at 206) a controller collection identification command to identify a collection of bus I/O controllers that are present in the storage device 108. In some examples, the controller collection identification command can include an NVME Identify command requesting a list of controllers that exist in the NVME subsystem (the storage device 108). The storage device 108 responds to this command by sending (at 208) information of the collection of bus I/O controllers included in the storage device 108. The response can include the identification values (e.g., numbers) (such as in the form of a list) assigned to the bus I/O controllers in the storage device 108.

Although FIG. 2 shows an example where two different commands are issued to discover a bus I/O controller that the adapter device 200 is connected to and to discover a collection of bus I/O controllers in the storage device 108, a different example can accomplish the same using a single query.

Note that the identification values (e.g., numbers) assigned to the bus I/O controllers of the storage device 108 can be assigned by the storage device 108 or by another entity in the storage system 106, such as firmware, software, or other machine-readable instructions.

As noted above, the identification values assigned to the bus I/O controllers are associated with or provide an indication of an order (referred to as an "identification value order") of the bus I/O controllers in the storage device 108.

In some cases, the list of identification values assigned to the bus I/O controllers returned by the storage device 108 may not be in order. In such cases, the adapter device 200 can sort (at 210) the identification values in the list, such as in ascending order or descending order.

If the identification values returned by the storage device 108 are already in order, then the sorting at 210 can be omitted.

The adapter device determines (at 212) a controller position (within the identification value order) of the given bus I/O controller (e.g., 116-1 or 116-2 in FIG. 1) to which the adapter device 200 is connected. For example, if the collection of bus I/O controllers in the storage device 108 are assigned identification values 50, 60, 70, and 80, then the identification value 50 indicates a first controller position in the dentification value order of bus I/O controllers, the identification value 60 indicates a second controller position in the dentification value order, the identification value 70 indicates a third controller position in the dentification value order, and the value 80 indicates a fourth controller position in the dentification value order.

The adapter device 200 determines (at 214) a quantity of supported connections over the ethernet network 104 to the storage device 108. The quantity of supported connections can refer to either an actual maximum quantity of connections supported by an adapter device, or the theoretical maximum quantity of connections defined by a standard, such as by the NVME-OF standard.

The actual maximum quantity of connections supported by an adapter device can refer to a maximum quantity of connections (how many connections) that any adapter device in the storage system 106 supports with the host(s). For example, if the adapter device 114-1 supports a maximum of P connections, and the adapter device 114-2 supports a maximum of Q connections (where Q>P), then the actual maximum quantity of connections supported by an adapter device is Q (i.e., the larger of the P and Q).

The theoretical maximum quantity of connections defined by the standard refers to the maximum quantity of connections (how many connections) that the standard allows to be established with a storage system.

The adapter device 200 computes (at 216) a controller identifier offset value for the adapter device, where the controller identifier offset value is used for calculating controller identifiers to assign to connections established between host(s) and the adapter device 200. The adapter device 200 can compute the controller identifier offset value based on the quantity of supported connections and the controller position of the given bus I/O controller to which the adapter device 200 is connected. For example, the adapter device 200 can multiply a value derived from the controller position with the quantity of supported connections, to produce the controller identifier offset. Note that the controller offset variable can be equal to the product of the value derived from the controller position and the quantity of supported connections, or can be derived from the product of the value derived from the controller position and the quantity of supported connections, such as by applying a specified function (e.g., a hash function or another function) on the product. Note that the controller identifier offset values computed for respective adapter devices do not have to follow the order of the controller positions of the bus I/O controllers.

In the example of FIG. 1 where there are two adapter devices 114-1 and 114-2, it is assumed that the adapter device 114-1 is connected to the bus I/O controller 116-1 in controller position 1, and the adapter device 114-2 is connected to the bus I/O controller 116-2 in controller position 2. It is also assumed that the quantity of supported connections is 1,500. Then the controller identifier offset value computed by the adapter device 114-1 is 0, which is equal to the product of (1−1)*1,500), and the controller identifier offset value computed by the adapter device 114-2 is 1,500, which is equal to the product of (2−1)*1,500. In the foregoing example, (1−1) and (2−1) are examples of multiplier factors computed for respective adapter devices. The multiplier factor for a given adapter device is computed from the controller position, such as by subtracting 1 from the controller position.

In some examples, a controller identifier offset value of an adapter device is based on (Controller Position−1)*(Quantity of Supported Connections). In other examples, a controller identifier offset can be based on other calculations that would generate suitable controller identifier offsets.

The adapter device 200 uses (at 218) the controller offset variable to assign controller identifiers to connections established between host(s) and the adapter device 200. Since different adapter devices have different controller offset variable values, the controller identifiers assigned by the different adapter devices will be different even if the different adapter devices use the same algorithm in assigning controller identifiers, such that there would be no conflict between controller identifiers assigned to different connections by respective different adapter devices.

For example, the algorithm used by each adapter device 114-1 or 114-2 sequentially increments controller identifiers assigned to connections as the connections are established. For example, the algorithm assigns controller identifiers in the following sequence: 1, 2, 3, etc. The controller identifiers assigned by the adapter device 114-1 using the algorithm would be {0+1, 0+2, 0+3, . . . }, while the controller identifiers assigned by the adapter device 114-2 using the algorithm would be {1,500+1, 1,500+2, 1,500+3, . . . }.

Figure 3:
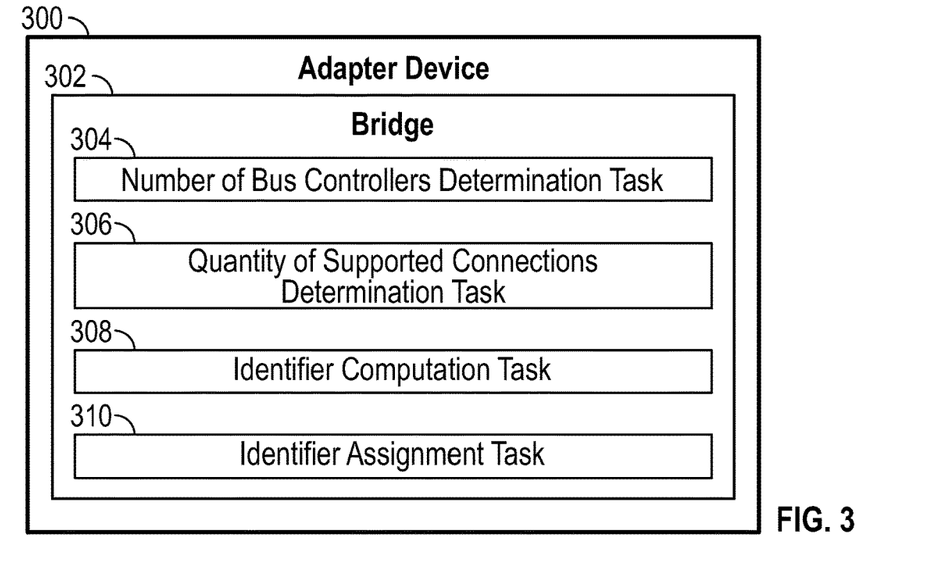
FIG. 3 is a block diagram of an adapter device according to some examples.

FIG. 3 is a block diagram of an adapter device 300 according to some examples of the present disclosure. The adapter device 300 includes a bridge 302 between a host and a storage device, where the bridge 302 is to communicate with the host over a network (e.g., an Ethernet network, an FC network, etc.).

In some examples, the bridge 302 is to convert between a command according to a first format (e.g., an NVME-OF format or another type of format) for the network and the command according to a different second format for a bus (e.g., a PCIE bus or another type of bus) between the adapter device and the storage device.

The bridge 302 is able to perform various tasks. For example, the tasks of the bridge 302 are performed by machine-readable instructions executed in the adapter device 300.

The tasks of the bridge 302 include a number of bus controllers determination task 304 to determine that the storage device includes a plurality of bus controllers (e.g., the bus I/O controllers 116-1 and 116-2 of FIG. 1). The plurality of bus controllers are communicatively coupled to respective adapter devices.

In some examples, the bridge 302 can determine that the storage device includes the plurality of bus controllers based on sending a query (e.g., the controller collection identification command sent at 206 in FIG. 2) to the storage device for information of bus controllers in the storage device.

The tasks of the bridge 302 include a quantity of supported connections determination task 306 to determine a quantity of supported connections over the network to the storage device.

In response to determining that the storage device includes the plurality of bus controllers, the bridge 302 performs tasks 308 and 310. Task 308 is an identifier computation task to compute an identifier (e.g., a controller identifier discussed above) based on the quantity of supported connections and to which respective bus controller of the plurality of bus controllers the adapter device is connected. Task 310 is an identifier assignment task to assign the identifier to a connection from the host to the storage device.

In some examples, the bridge 302 is to, in response to determining that the storage device includes the plurality of bus controllers, sort identification values of the plurality of bus controllers to produce a sorted order of the plurality of bus controllers, and determine a position of the respective bus controller (to which the adapter device is connected) in the sorted order of the plurality of bus controllers. The identifier assigned to the connection is based on the quantity of supported connections and the position of the respective bus controller in the sorted order.

In some examples, the bridge 302 is to compute an offset value based on the quantity of supported connections and the position of the respective bus controller in the sorted order, where the identifier is based on the offset value.

In some examples, the bridge 302 computes the identifier based on the offset value and how many connections have been established over the network to the storage device through the adapter device. For example, the bridge 302 may successively assign monotonically increasing identifiers to connections as they are established, and the identifier assigned to a current connection being established from the host to the storage device is the next available identifier value that is larger than previously assigned identifiers to previously established connections.

In some examples, the offset value computed by the adapter device is different from an offset value computed by a further adapter device connected to the storage device and used by the further device in assigning identifiers to connections from host(s) through the further adapter device to the storage device.

Figure 4:
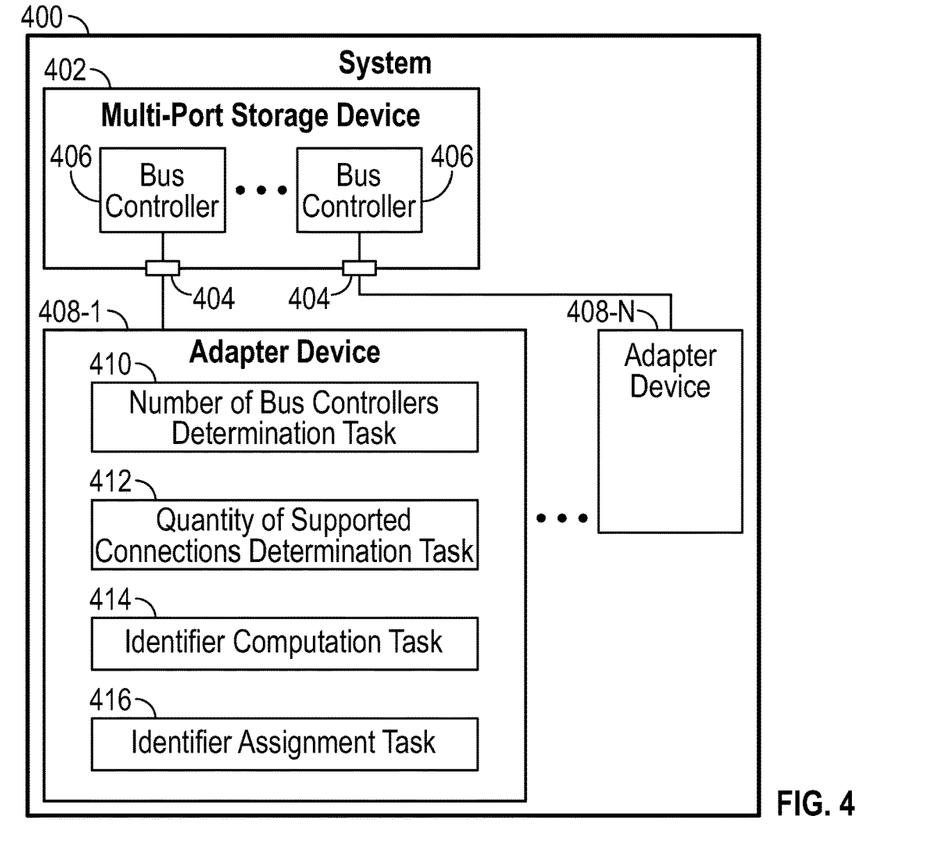
FIG. 4 is a block diagram of a system according to some examples.

FIG. 4 is a block diagram of a system 400 (e.g., the storage system 106 of FIG. 1) according to some examples.

The system 400 includes a multi-port storage device 402 including a plurality of bus ports 404 and bus controllers 406 connected to respective bus ports 404.

The system 400 includes a plurality of adapter devices 408-1 to 408-N (where N≥2) connected to the respective bus ports 404. A first adapter device (any of 408-1 to 408-N) is able to perform various tasks.

The tasks of the first adapter device include a number of bus controllers detection task 410 to detect that the multi-port storage device includes the plurality of bus controllers 406.

The tasks of the first adapter device include a quantity of supported connections determination task 412 to determine a quantity of supported connections over a network to the multi-port storage device.

The first adapter device is to perform tasks 414 and 416 in response to determining that the multi-port storage device 402 includes the plurality of bus controllers 406. Task 414 is an identifier computation task to compute an identifier based on the quantity of supported connections and a determination that the first adapter device is connected to a first bus controller of the plurality of bus controllers. Task 416 is an identifier assignment task to assign the identifier to a connection from a host to the storage device through the first adapter device.

In some examples, the plurality of adapter devices are connected over buses to the respective bus ports of the multi-port storage device, where communications over the buses are according to a first standard (e.g., a PCIE standard or another computer bus standard) that is different from a second standard (e.g., NVME-OF or another network fabric standard) governing communications over the network.

Figure 5:
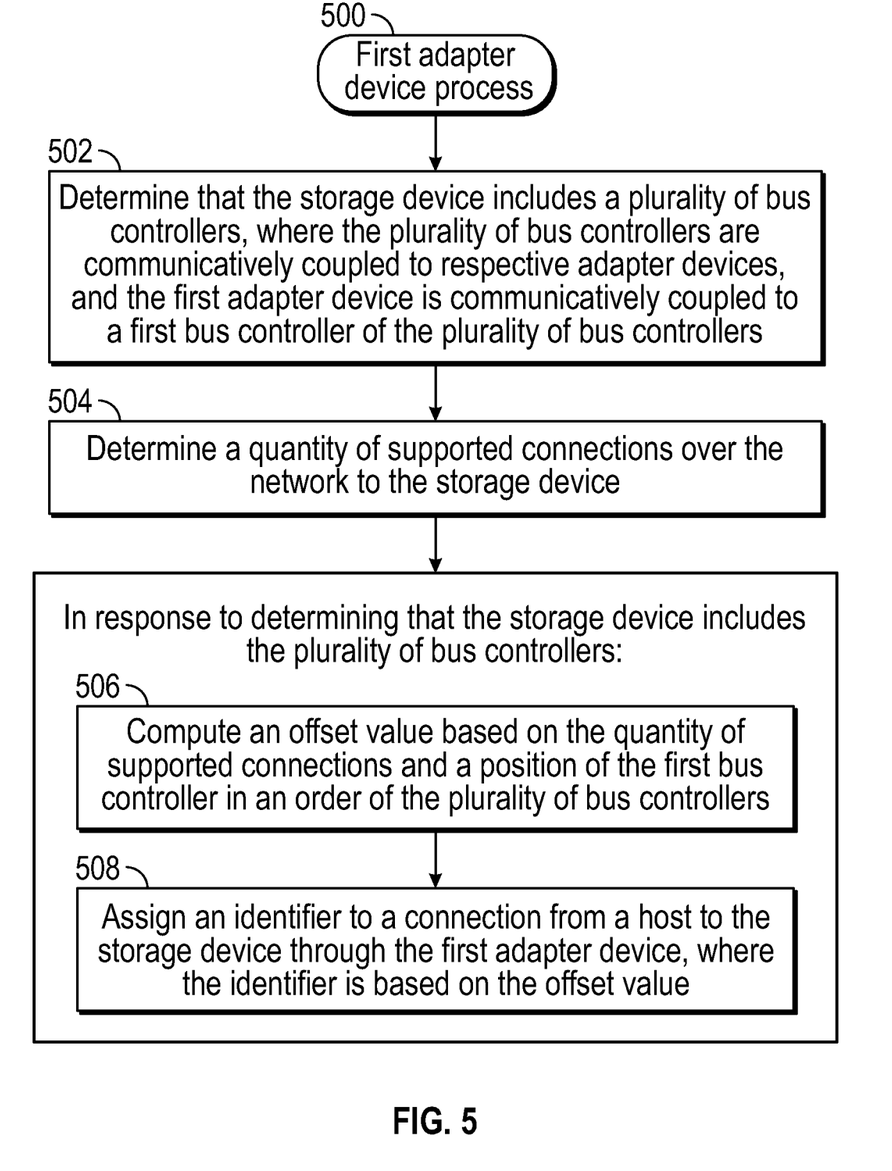
FIG. 5 is a flow diagram of a process according to some examples.

FIG. 5 is a flow diagram of a process 500 according to some examples, which can be performed by a first adapter device (e.g., any of adapter devices 114-1 to 114-2 in FIG. 1 or 408-1 to 408-N in FIG. 4).

The process 500 includes determining (at 502) that the storage device includes a plurality of bus controllers, where the plurality of bus controllers are communicatively coupled to respective adapter devices, and the first adapter device is communicatively coupled to a first bus controller of the plurality of bus controllers.

The process 500 includes determining (at 504) a quantity of supported connections over the network to the storage device.

The process 500 includes performing tasks 506 and 508 in response to determining that the storage device includes the plurality of bus controllers. Task 506 includes computing an offset value based on the quantity of supported connections and a position of the first bus controller in an order of the plurality of bus controllers. Task 508 includes assigning an identifier to a connection from a host to the storage device through the first adapter device, wherein the identifier is based on the offset value.

In examples where tasks according to some implementations are performed via machine-readable instructions, the machine-readable instructions are stored in a non-transitory machine-readable or computer-readable storage medium. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An adapter device comprising:
a bridge between a host and a storage device, wherein the bridge is to communicate with the host over a network, wherein the bridge is to:
determine that the storage device comprises a plurality of bus controllers, wherein the plurality of bus controllers are communicatively coupled to respective adapter devices;
determine a quantity of supported connections over the network to the storage device; and
in response to determining that the storage device comprises the plurality of bus controllers:
compute an identifier based on the quantity of supported connections and to which respective bus controller of the plurality of bus controllers the adapter device is connected, and
assign the identifier to a connection from the host to the storage device.

2. The adapter device of claim 1, wherein the bridge is to convert between a command according to a first format for the network and the command according to a different second format for a bus between the adapter device and the storage device.

3. The adapter device of claim 2, wherein the first format comprises a NON-VOLATILE MEMORY EXPRESS (NVME)-OVER-FABRICS format.

4. The adapter device of claim 1, wherein the bridge is to determine that the storage device comprises the plurality of bus controllers based on sending a query to the storage device for information of bus controllers in the storage device.

5. The adapter device of claim 1, wherein the bridge is to, in response to determining that the storage device comprises the plurality of bus controllers:
sort identification values of the plurality of bus controllers to produce a sorted order of the plurality of bus controllers,
determine a position of the respective bus controller in the sorted order of the plurality of bus controllers,
wherein the computing of the identifier is based on the quantity of supported connections and the position of the respective bus controller in the sorted order.

6. The adapter device of claim 5, wherein the bridge is to compute an offset value based on the quantity of supported connections and the position of the respective bus controller in the sorted order, and wherein the identifier is based on the offset value.

7. The adapter device of claim 6, wherein the bridge is to compute the identifier based on the offset value and how many connections have been established over the network to the storage device through the adapter device.

8. The adapter device of claim 7, wherein the bridge is to compute the identifier based on the offset value and a next available identifier value that depends on how many connections have previously been assigned identifiers.

9. The adapter device of claim 6, wherein the offset value for the adapter device is different from an offset value of another adapter device connected to the storage device and used by the another adapter device in assigning identifiers to connections.

10. The adapter device of claim 1, wherein the quantity of supported connections represents how many connections over the network are supported by the adapter device or another adapter device connected to the storage device.

11. The adapter device of claim 1, wherein the quantity of supported connections represents a maximum quantity of connections specified by a standard.

12. A system comprising:
a multi-port storage device comprising a plurality of bus ports and a plurality of bus controllers connected to respective bus ports of the plurality of bus ports;
a plurality of adapter devices connected to the respective bus ports, wherein a first adapter device of the plurality of adapter devices is to:
detect that the multi-port storage device comprises the plurality of bus controllers;
determine a quantity of supported connections over a network to the multi-port storage device; and
in response to determining that the multi-port storage device comprises the plurality of bus controllers:
compute an identifier based on the quantity of supported connections and a determination that the first adapter device is connected to a first bus controller of the plurality of bus controllers, and
assign the identifier to a connection from a host to the storage device through the first adapter device.

13. The system of claim 12, wherein the plurality of adapter devices are connected over buses to the respective bus ports of the multi-port storage device, and wherein communications over the buses are according to a first standard that is different from a second standard governing communications over the network.

14. The system of claim 12, wherein the quantity of supported connections represents how many connections over the network are supported by the first adapter device or another adapter device connected to the multi-port storage device.

15. The system of claim 12, wherein the quantity of supported connections represents a maximum quantity of connections specified by a standard.

16. The system of claim 15, wherein the standard comprises a NON-VOLATILE MEMORY EXPRESS (NVME)-OVER-FABRICS standard.

17. The system of claim 12, wherein the first adapter device is to:
determine a position of the first bus controller in an order of the plurality of bus controllers,
compute an offset value based on the quantity of supported connections and the position of the first bus controller in the order, and
compute the identifier based on the offset value.

18. The system of claim 17, wherein a second adapter device of the plurality of adapter devices is to:
detect that the multi-port storage device comprises the plurality of bus controllers;
determine the quantity of supported connections over the network to the multi-port storage device; and
in response to the second adapter device determining that the multi-port storage device comprises the plurality of bus controllers:
determine a position of a second bus controller in the order of the plurality of bus controllers, the second bus controller connected to the second adapter device,
compute a further offset value based on the quantity of supported connections and the position of the second bus controller in the order,
compute a further identifier based on the further offset value, and
assign the further identifier to a connection from a host to the storage device through the second adapter device.

19. A method of a first adapter device for a storage device, comprising:
determining that the storage device comprises a plurality of bus controllers, wherein the plurality of bus controllers are communicatively coupled to respective adapter devices, and the first adapter device is communicatively coupled to a first bus controller of the plurality of bus controllers;
determining a quantity of supported connections over a network to the storage device; and
in response to determining that the storage device comprises the plurality of bus controllers:
computing an offset value based on the quantity of supported connections and a position of the first bus controller in an order of the plurality of bus controllers, and
assigning an identifier to a connection from a host to the storage device through the first adapter device, wherein the identifier is based on the offset value.

20. The method of claim 19, wherein the offset value computed by the first adapter device is different from an offset value computed by a second adapter device for deriving identifiers assigned to connections from a host to the storage device through the second adapter device.

* * * * *